United States Patent
Olma et al.

(10) Patent No.: US 11,146,070 B2
(45) Date of Patent: Oct. 12, 2021

(54) METHOD FOR OPERATING A MOBILE POWER SUPPLY DEVICE

(71) Applicant: Olmatic GmbH, Nagold (DE)

(72) Inventors: Tobias Olma, Herrenberg-Haslach (DE); Patrick Olma, Horb am Neckar (DE); Christian Olma, Nagold (DE)

(73) Assignee: Olmatic GmbH, Freudenstadt (DE)

( * ) Notice: Subject to any disclaimer, the term of this patent is extended or adjusted under 35 U.S.C. 154(b) by 0 days.

(21) Appl. No.: 16/775,408

(22) Filed: Jan. 29, 2020

(65) Prior Publication Data

US 2020/0251905 A1 Aug. 6, 2020

(30) Foreign Application Priority Data

Feb. 4, 2019 (EP) ..................................... 19155283

(51) Int. Cl.
*H02J 3/32* (2006.01)
*H02J 3/38* (2006.01)
*H02J 7/00* (2006.01)

(52) U.S. Cl.
CPC ................ *H02J 3/32* (2013.01); *H02J 3/381* (2013.01); *H02J 7/007* (2013.01); *H02J 2300/24* (2020.01); *H02J 2300/28* (2020.01)

(58) Field of Classification Search
CPC .... H02J 3/32; H02J 3/381; H02J 7/007; H02J 300/28; H02J 300/24; H02J 7/00
See application file for complete search history.

(56) References Cited

U.S. PATENT DOCUMENTS

| | | | |
|---|---|---|---|
| 2003/0102720 A1* | 6/2003 | Baggs | H02J 3/36 307/149 |
| 2007/0257654 A1 | 11/2007 | Krajcovic | |
| 2010/0134077 A1 | 6/2010 | Krajcovic | |
| 2014/0285010 A1 | 9/2014 | Cameron | |
| 2015/0318705 A1* | 11/2015 | Lucas | H02J 3/386 307/129 |

FOREIGN PATENT DOCUMENTS

DE 299 14 308 A1 2/2000
JP 2014 131413 A 7/2014

OTHER PUBLICATIONS

European Search Report for corresponding Application No. 19 15 5283, dated Jul. 11, 2019.

* cited by examiner

*Primary Examiner* — Robert L Deberadinis
(74) *Attorney, Agent, or Firm* — Renner, Otto, Boisselle & Sklar, LLP

(57) ABSTRACT

Proposed is to provide a power supply device with a programmable controller, and to deactivate or to throttle power outputs according to the programmable priorities thereof when the power from regenerative energy sources and from electrical energy stores of the power supply device is not sufficient to operate all the connected power loads. Conventional power sources can be connected when the electrical energy stores are discharged below a minimum value.

9 Claims, 1 Drawing Sheet

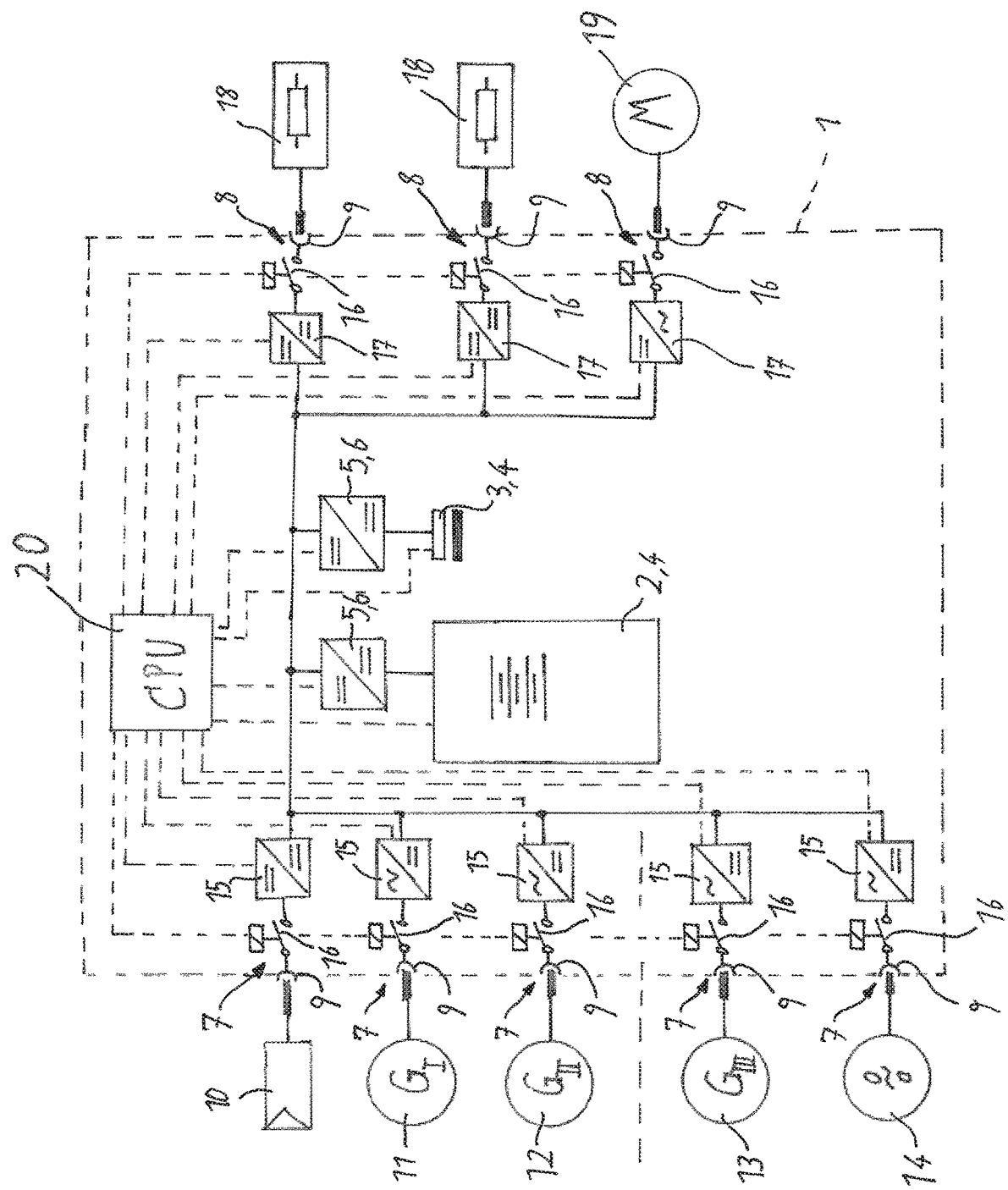

METHOD FOR OPERATING A MOBILE POWER SUPPLY DEVICE

This application claims priority under 35 USC § 119 to European Patent Application No. 19 155 283.5, filed on Feb. 4, 2019, the entire disclosure of which is incorporated herein by reference.

TECHNICAL FIELD OF THE INVENTION

The invention relates to a method for operating an, in particular mobile, power supply device having the features described herein. "Power" here refers to electrical current or, in general terms, electrical energy.

DISCUSSION OF THE RELATED ART

Utility model DE 299 14 308 A1 discloses a mobile power supply device comprising a rechargeable battery, serving as an electric energy store, which refers to an energy store for storing electrical energy. Low-voltage DC power loads having a rated voltage of 12 volts or 24 volts and AC power loads having a rated voltage of 110 volts or 230 volts can be connected to the power supply device, or to the rechargeable battery thereof, at a frequency of 50 hertz or 60 hertz. The known power supply device comprises voltage transformers and inverters for connecting the power loads to the rechargeable battery. The known power supply device provides regenerative energy sources, such as solar modules, a wind turbine and a water turbine, for charging the rechargeable battery, the known power supply device comprising charge controllers for the connection thereof. Moreover, a connection to a low-voltage DC power generator and to a power supply network is possible, for which purpose the power supply device likewise comprises charge controllers.

SUMMARY OF THE INVENTION

It is the object of the invention to propose a method by which different loads can be supplied with power of an electrical energy store and regenerative electrical energy for as long as possible.

The power supply device according to the invention comprises, in particular, one or more rechargeable batteries, serving as energy stores for electrical energy. In addition to, or instead of, the rechargeable battery, the power supply device according to the invention can comprise one or more other electrical energy stores, such as one or more electrical capacitors, for example. Furthermore, the power supply device comprises one or more power inputs and one or more power outputs, each comprising a voltage transformer for the adaptation to a voltage of the energy store or stores of the power supply device or for the adaptation to a rated voltage of the power supply device, which can have a different voltage than the energy store thereof. The voltage transformers can be DC voltage transformers, which change a supplied DC voltage into a DC voltage having the same, a higher, a lower or an inverted voltage level, AC voltage transformers, which change a supplied AC voltage into a DC voltage having the same, a higher, a lower or an inverted voltage level, and/or inverters, which change a supplied DC voltage into an AC voltage having the same, a higher or a lower voltage level. The power supply device can comprise a charge controller for the electrical energy store. The charge controller for the energy store or stores is, in particular, controllable, which is to say the charge controller can be deactivated by way of a programmable controller, which will be described below, so that the energy store or stores can be disconnected from the power inputs and the power outputs, and/or can be throttled, whereby a charging current and/or a discharging current of the energy store or stores can be reduced, controlled or regulated. The energy store or stores can be charged while power loads connected to the power outputs are being operated, which is to say supplied with power.

The power supply device is preferably, but not necessarily, mobile, and may also be stationary.

The power inputs are provided for the connection to preferably regenerative energy sources, such as, in particular, one or more solar modules, one or more wind turbines and, if present, one or more water turbines. In addition, in particular in the event that the power or the electrical energy of the regenerative power sources is not sufficient to operate connected power loads, power inputs for conventional power sources, such as, in particular, a power generation unit and/or an electrical power supply network, may be present.

The power outputs are provided for connecting essentially arbitrary DC and/or AC power low-voltage and/or high-voltage power loads.

According to the invention, the power supply device comprises a programmable controller, which controls the voltage transformers of the power outputs and of the energy store or stores, or the charge of the energy store or stores, according to predefinable, that is programmable, criteria. As a result of programming, the criteria are variable and adaptable to the particular use of the power supply device. Priorities are assigned to the power outputs, for example, one or more power outputs can be established as indispensable, and one or more other power outputs can be established as overriding, subordinate and/or dispensable. It is also possible to establish power outputs as throttlable. If the electrical power that is available at the power inputs and the electrical energy stored in the electrical energy store are not sufficient to supply the power loads connected to the power outputs, according to the invention dispensable power outputs and/or low-priority power outputs are deactivated and/or throttlable power outputs are throttled. The deactivation and/or throttling take place, in particular, by controlling the voltage transformers assigned to the power outputs by way of the programmable controller of the power supply device according to the invention. Lower-priority power outputs are deactivated or throttled before higher-priority power outputs.

Similarly to the power outputs, it is also possible in embodiments of the invention to assign priorities, rankings or criteria to the power inputs, according to which these are activated, deactivated and/or throttled. The power inputs are also activated, deactivated and/or throttled on the input side, in particular, by controlling the voltage transformers thereof as a result of control by way of the programmable controller. The control takes place according to predefinable, which is to say programmable, criteria, which can be varied as a result of reprogramming or new programming and adapted to the particular use of the power supply device. For example, power inputs for alternative power sources can be established as overriding and/or power inputs for conventional power sources can be established as subordinate, so that the operation of the power loads and/or the charging process of the energy store or stores take place, preferably exclusively or to as great an extent as possible, by way of alternative energy sources. It is also possible to establish a ranking within the power inputs for alternative power sources and/or within the power inputs for conventional power sources, so that, for example, power from a power source that is classified as particularly harmful to the environment is only used if this is unavoidable.

As was stated above, it is also possible to throttle the charging current of the energy store or stores by way of the charge controller thereof.

According to the invention, it is also possible, in particular, to deactivate and/or throttle power outputs of the power supply device as a function of a charge state of the energy store or stores. For example, dispensable power outputs and low-priority power outputs are throttled or deactivated with increasing discharge of the energy store or also for charging the energy store. With increasing discharge of the energy store or stores, additional higher-priority power outputs can be consecutively deactivated and/or throttled, so that indispensable power loads can be supplied with electrical power without interruption, if possible, and high-priority power loads can be supplied with electrical power for as long as possible.

One advantage of the invention is that, with an optimal design, power can be supplied entirely, or in any case substantially, self-sufficiently, from preferably alternative (regenerative) power sources and/or substantially or entirely independently of line current and/or conventional energy sources. The power supply device is preferably mobile; however, a stationary power supply device is likewise possible.

According to one embodiment of the invention, established power inputs are only activated if the power that is available at the other power inputs of the power supply device is not sufficient to supply all or a portion of the power loads and optionally to charge the energy store or stores of the power supply device. For this purpose, in particular, the power inputs are selected which are connected to conventional energy sources or intended to be connected to conventional energy sources. In this way, the energy store or stores can preferably be charged from regenerative energy sources and connected power loads can be operated with regenerative energy. The established power inputs can also be activated if it is foreseeable that the power of regenerative energy sources to which the power inputs of the power supply are connected and/or the electrical energy stored in the energy store or stores of the power supply unit will not be sufficient to operate the power loads connected to the power supply device for a sufficient time. Here as well, it is possible to take the priorities of the power loads into consideration, and to throttle and/or deactivate dispensable power loads and/or lower-priority power loads, or to schedule the throttling and/or deactivation so as to be able to dispense with power supply using conventional energy sources, if possible It is also possible to activate the established power inputs for, in particular, conventional energy sources as a function of a charge state of the energy store or stores. For example, the energy store or stores of the power supply device can be charged using current from conventional energy sources when the energy store or stores is or are, or has or have been, discharged below an establishable minimum value.

According to the invention, it is also possible to assign priorities to the energy store or stores as a function of the charge states thereof, so that, for example, the charging process of the energy store or stores is assigned an increasing priority with increasing discharge thereof, which means that power loads are throttled or deactivated to charge the energy store or stores, to maintain the charge state thereof or to slow the discharge thereof.

One embodiment of the invention provides for a waterproof power supply device and/or underwater connectors for the power inputs and the power outputs. The power supply device can be absolutely waterproof so as to be able to operate under water. It is also possible for this to be imperviousness to splashing water, which impinges on the power supply device at varying velocities from different directions. It is also possible for the power supply device to be impervious to dust and/or soiling according to different criteria. Underwater connectors refer to electrical plug-in connectors that are waterproof and which, if plugged in above water, can be operated under water, or which can be plugged in, operated and unplugged under water.

All of the features mentioned in the description and/or shown in the drawing can be implemented individually alone, or in any arbitrary combination, in embodiments of the invention. Embodiments of the invention that do not comprise all, but only some of the features of a claim, or of the independent claim, are possible.

BRIEF DESCRIPTION OF THE DRAWING

FIG. 1 is an electrical circuit diagram in accordance with an embodiment of the invention.

DETAILED DESCRIPTION OF THE INVENTION

The power supply device 1 according to the invention, a circuit diagram for which is shown in FIG. 1, comprises a rechargeable battery 2, and additionally an electrical capacitor 3, serving as electrical energy stores 4 for storing electrical energy. The power supply device 1 can also comprise a plurality of rechargeable batteries 2 and/or a plurality of capacitors 3, or only one rechargeable battery 2 or only one capacitor 3, serving as electrical energy stores 4. Electrical energy stores other than batteries or capacitors are possible. The rechargeable battery 2 and the capacitor 3 and, in general terms, any electrical energy store 4, comprise a charging current controller 5, which, in general terms, can also be interpreted as a voltage transformer 6.

The power supply device 1 comprises a plurality of power inputs 7 and power outputs 8. Each power input 7 and each power output 8 comprises an electrical plug-in device 9, in particular an electrical plug coupling or an electrical connector for connecting a respective electrical energy source or a power load. The plug-in devices 9 are preferably underwater connectors, which can be operated under water if these were plugged in above water, or which can be plugged in, operated and unplugged under water.

In the exemplary embodiment of the invention, power inputs 7 for regenerative electrical energy sources, namely for a solar module 10, a wind turbine 11 and a water turbine 12, are provided. Additional power inputs 7 for conventional energy sources, for example for a power generation unit 13 (emergency power generator) or a public power supply network 14, can be present. Each power input 7 comprises a voltage transformer 15, which are DC or AC voltage transformers which are both intended for connecting a provided power source, and serve to change the DC or AC voltage thereof into a DC voltage of the power supply device 1. The charging current controllers 5 of the electrical energy stores 4 of the power supply device 1 are connected to the voltage transformers 15 of the power inputs 7. The voltage transformer 15 for the solar module 10 can also be interpreted as a solar charge controller.

The power supply device 1 comprises electrical switches 16 between each power input 7 and the assigned voltage transformer 15, which can be used to electrically disconnect the power inputs 7 from the voltage transformers 15. The circuit diagram shows switches 16 that can be actuated by solenoids. However, electronic switching elements, such as thyristors, can also be used as switches 16. In particular, the power inputs 7 comprise electromechanical contactors or semiconductor contactors, serving as switches, which can be used to disconnect all the lines of the particular power input 7 from the assigned voltage transformer 15, which is to say current-carrying conductors (external conductors, neutral conductors) as well as dead conductors (protective ground conductors). As a result, the power inputs 7 can be galvanically isolated from the assigned voltage transformers 15.

The power outputs 8 likewise comprise voltage transformers 17, by way of which these are connected to the voltage transformers 15 of the power inputs 7 and to the charging current controllers 5 of the electrical energy stores 4. The power outputs 8 are provided for the connection of low-voltage and/or high-voltage power loads 18, 19 and/or for the connection of DC and/or AC power loads 18, 19. The drawing shows low-voltage DC power loads 18 and a high-voltage AC power load/line voltage load 19, wherein the invention is not limited to the shown combination. The power outputs 8 comprise DC voltage transformers and possibly inverters, the current type (DC or AC current) and voltage of which is adapted to the respective power load 18, 19 intended to be connected, or is adaptable by way of a programmable controller 20. The DC voltage transformers and/or inverters are referred to in general terms as voltage transformers 17 here.

Similarly to the power inputs 7, the power outputs 8 comprise plug-in devices 9 including underwater connectors, and electrical switches 16 disposed between the voltage transformers 17 and the plug-in devices 9 and the voltage transformers 17, by way of which the power outputs 8 can be galvanically isolated from the assigned voltage transformers 17. Similarly to the power inputs 7, the switches 16 of the power outputs 8 are, in particular, electromechanical contactors or semiconductor contactors, wherein other switches 16, for example, electromagnetically actuatable switches 16 or electronic switching elements, such as thyristors, can likewise be used as switches 16.

The voltage transformers 15, 17 of the power inputs 7 and power outputs 8 and the charging current controllers 5 of the electrical energy stores 4 are controllable.

Moreover, the power supply device 1 according to the invention comprises a programmable electronic controller 20 for controlling the charging current controllers 5 or voltage transformers 6 of the electrical energy store or stores 4, for controlling the voltage transformers 15, 17 of the power inputs 7 and of the power outputs 8, and for controlling the switches 16 of the power inputs 7 and of the power outputs 8. The electronic controller 20 can also be interpreted as a processor or as an electronic control unit and comprise a single-chip microcontroller or a single-board computer. More complex computers or the like can also be used as the programmable electronic controller 20.

Priorities are assigned to the power outputs 8 by way of programming of the controller 20. Power outputs 8 can be identified as indispensable and/or as throttlable. If the power that is supplied by the regenerative power sources 10, 11, 12 and/or the electrical energy stored in the energy store 4 is not sufficient for the operation of all the power loads 18 connected to the power supply device 1, initially the power outputs 8 having the lowest priority are switched off and/or throttlable power outputs 8 are throttled. The deactivation can take place by way of the voltage transformers 17 and/or the switches 16, and the throttling can take place by way of the voltage transformers 17. If the power is still not sufficient for the remaining power loads 18, additional low-priority power outputs 8 are deactivated.

It is also possible to throttle or deactivate power outputs 8 when the energy stored in the electrical energy stores 4 drops below a minimum value that is variably established by programming of the controller 20, or if the power supply of high-priority power loads 18 is only ensured for a limited remaining time, which can likewise be variably established by programming of the controller 20.

Likewise, it can be established that power inputs 7 that, in particular, are intended for the connection of conventional power sources 13, 14 are only activated when the energy stored in the electrical energy stores 4 drops below a variably established minimum value, so that the power loads 18 are preferably supplied with regeneratively generated power.

Prioritization and throttling of the power inputs 7 is possible in a manner similar to the power outputs 8 and takes place by appropriately controlling the voltage transformers 15 of the power inputs 7 by way of the programmable controller 20.

According to the invention, it is also possible to assign priorities to the electrical energy stores 4, so that the high-priority electrical energy stores 4 are given preference in terms of charging. The charging current of low-priority electrical energy stores 4 can be throttled or deactivated. It is also possible to control or regulate a ratio of the charging currents of different electrical energy stores 4, wherein the charging current ratio of the different energy stores 4 can change during the charging process, for example, as a function of the charge state of the energy stores 4, the available electrical energy at the power inputs 7, which can change during the charging process of the energy stores 4, and/or the electrical energy demand of the power loads 18, 19 connected to the power outputs 8, which can likewise change during the charging process of the energy stores 4. The priority of the energy stores 4 can be made dependent on the charge state thereof, which is to say the priority of the energy stores 4 increases with the discharge thereof. Power outputs 8 can be deactivated or throttled to charge the energy stores 4.

As a result of reprogramming or newly programming of the controller 20, the power supply device 1 can be arbitrarily adapted to the connected power sources 10, 11, 12, 13, 14, the power loads 18 and the electrical energy stores 4, and be changed at any time.

The invention claimed is:

1. A method for operating a power supply device, comprising one or more electrical energy stores, power inputs comprising voltage transformers, power outputs comprising voltage transformers and a programmable controller controlling the voltage transformers, wherein priorities are assigned to the power outputs, and low-priority power outputs are deactivated or throttled when the power inputs and/or the energy stores do not provide sufficient power to supply all the power outputs.

2. The method according to claim 1, wherein a priority is assigned to the energy store, which is dependent on the charge state thereof.

3. The method according to claim 1, wherein the energy store comprises a charging current controller, which is controlled by the controller.

4. The method according to claim 3, wherein a charging current of the energy store/charging currents of the energy stores can be controlled or regulated by controlling the assigned charging current controller or controllers by way of the programmable controller.

5. The method according to claim 1, wherein the power supply device is waterproof.

6. The method according to claim 5, wherein the power supply device comprises underwater connectors.

7. A method for operating a power supply device, comprising one or more electrical energy stores, power inputs comprising voltage transformers, power outputs comprising voltage transformers and a programmable controller controlling the voltage transformers, wherein priorities are assigned to the power outputs, and low-priority power outputs are deactivated or throttled when the power inputs and/or the energy stores do not provide sufficient power to supply all the power outputs, wherein priorities are assigned to the power inputs, and high-priority power inputs are preferably activated and/or low-priority power inputs are deactivated or throttled according to the ranking thereof and are activated as a function of a variably establishable charging current of the energy store or stores and/or of the power demand of power loads connected to the power outputs.

8. A method for operating a power supply device, comprising one or more electrical energy stores, power inputs comprising voltage transformers, power outputs comprising voltage transformers and a programmable controller controlling the voltage transformers, wherein priorities are assigned to the power outputs, and low-priority power outputs are deactivated or throttled when the power inputs and/or the energy stores do not provide sufficient power to supply all the power outputs, wherein established power inputs are only activated when the power of the other power inputs and/or of the electrical energy store is not sufficient to supply the power outputs that are not to be deactivated, and throttled power outputs that cannot be throttled further.

9. The method according to claim 8, wherein the established power inputs are only activated when the energy store has been/will be discharged below an establishable minimum value.

* * * * *